United States Patent [19]

Capurka

[11] Patent Number: 5,557,191

[45] Date of Patent: Sep. 17, 1996

[54] APPARATUS FOR MINIMIZING CURRENT DRAIN IN A BATTERY POWERED DATA COLLECTOR

[75] Inventor: Zbynek A. Capurka, Palatine, Ill.

[73] Assignee: Motorola, Inc., Schaumburg, Ill.

[21] Appl. No.: 219,599

[22] Filed: Mar. 29, 1994

[51] Int. Cl.$^6$ .................................................. H02J 7/00
[52] U.S. Cl. .................................. 320/48; 320/21; 320/2
[58] Field of Search .............................. 320/2, 19, 21, 320/48; 307/116, 126, 131; 324/426, 427; 340/656

[56] References Cited

U.S. PATENT DOCUMENTS

| | | | |
|---|---|---|---|
| 4,583,034 | 4/1986 | Martin | 320/21 |
| 5,136,620 | 8/1992 | Eaves | 377/15 |
| 5,151,644 | 9/1992 | Pearson et al. | 320/14 |

*Primary Examiner*—Peter S. Wong
*Assistant Examiner*—Gregory J. Toatley, Jr.
*Attorney, Agent, or Firm*—Nicholas C. Hopman

[57] ABSTRACT

An apparatus for minimizing current drain in a battery powered data collector includes a stimulus device. In response to receipt of a first state of a control signal, the stimulus device provides a periodic stimulus signal. In response to receipt of a second state of the control signal the stimulus device ceases provision of the signal. A switch device is coupled between the stimulus device and a load. When the switch device is in an on-state, and the signal is provided from the stimulus device, the switch device provides the signal to the load causing depletion of energy from the battery into the load. Responsive thereto the switch device provides the second state of the control signal to the control input of the stimulus device, that then ceases the provision of the signal to the load thus ceasing the depletion of the energy from the battery.

13 Claims, 2 Drawing Sheets

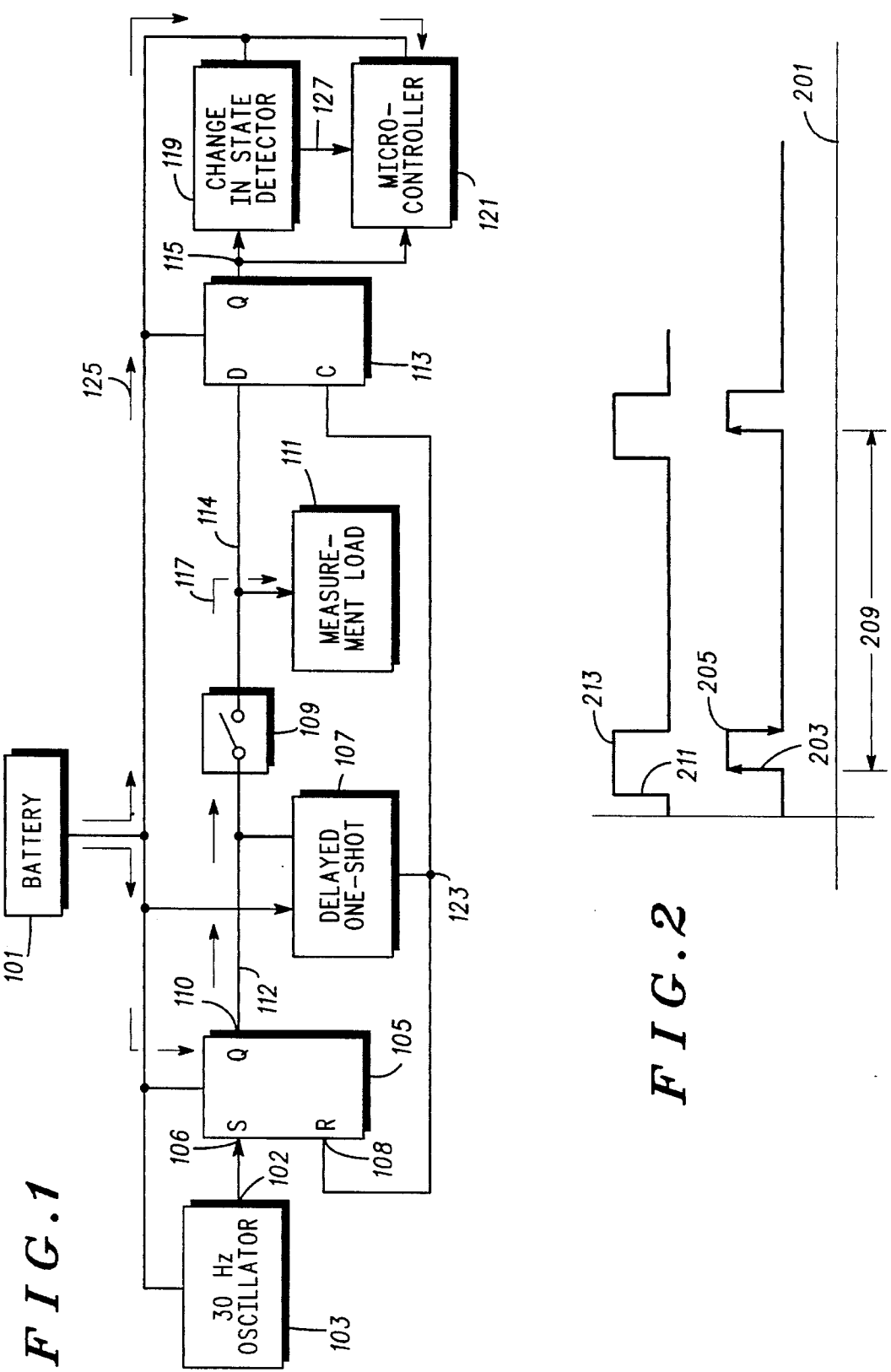

APPARATUS FOR MINIMIZING CURRENT DRAIN IN A BATTERY POWERED DATA COLLECTOR

FIELD OF THE INVENTION

This invention is generally directed to the field of electronic control devices, and specifically for electronic control devices that must operate on minimal power. In particular, it is useful for minimizing current drain in a battery powered data collector.

BACKGROUND OF THE INVENTION

In contemporary battery operated control systems current drain on the battery can significantly impact a product's usefulness. In a class of battery operated control systems that need to acquisition various information by interpreting input signals, the current drain associated with the signal acquisition can be significant. This is because to reduce effects of external noise on an input measurement, the load impedance of the input circuit must be kept relatively small. Keeping the load impedance of the input circuit relatively small prevents electromagnetic interference from appearing like an input stimulus.

The problem with creating such a relatively low input circuit load impedance is that it requires a relatively high amount of power to operate—and thus creates a significant drain on the battery. Furthermore, such battery operated control systems typically have control circuitry coupled to the input circuit for acting on input stimulus. This control circuitry also can consume significant amounts of energy from the battery.

What is needed is an improved apparatus for minimizing input measurement circuit and control circuit current drain in a battery powered data collector.

BRIEF DESCRIPTION OF THE DRAWINGS

FIG. 1 is a schematic block diagram illustrating an apparatus for minimizing current drain in a battery powered data collector, in accordance with a preferred embodiment of the invention;

FIG. 2 is a chart illustrating a timing waveform used to describe the operation of the circuit shown in FIG. 1;

DETAILED DESCRIPTION OF A PREFERRED EMBODIMENT

Figure 3:
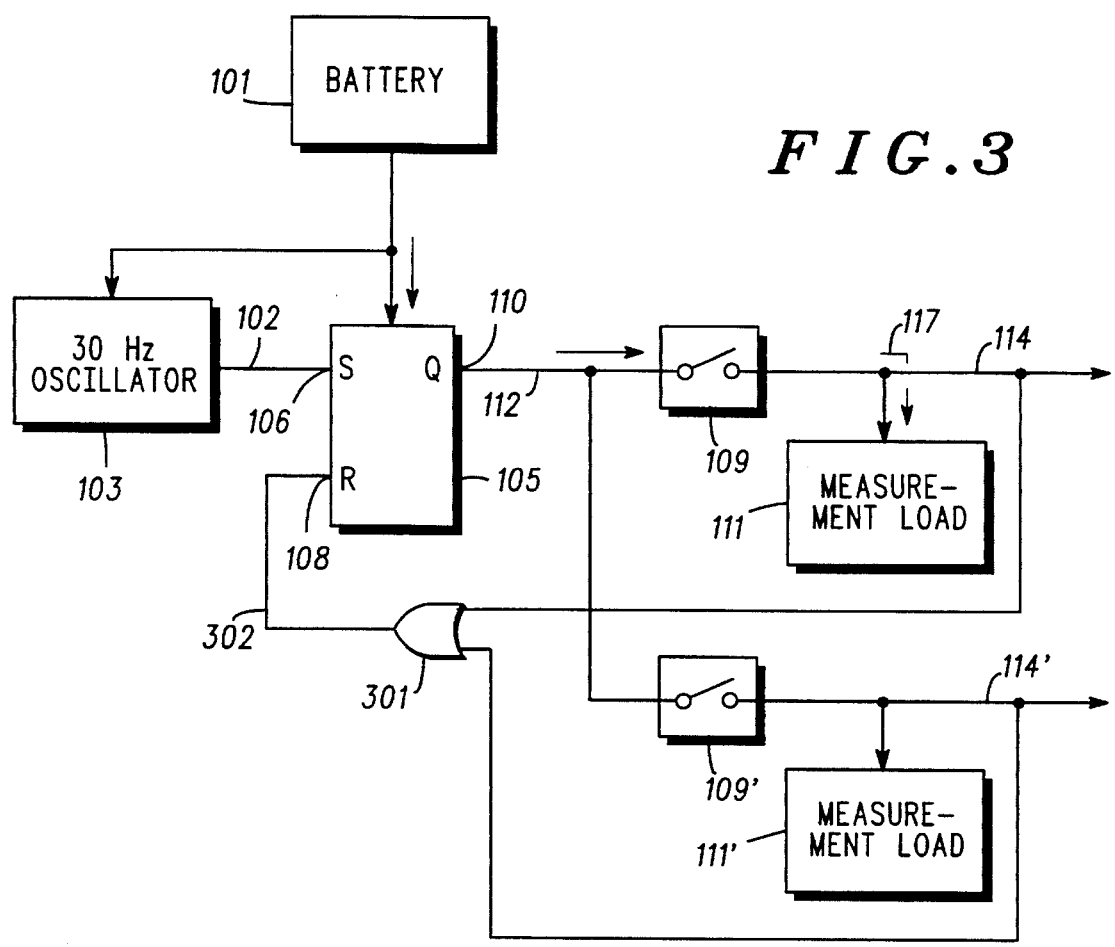
FIG. 3 is a schematic block diagram illustrating an apparatus for minimizing current drain in a battery powered data collector, in accordance with an alternative embodiment of the invention.

An apparatus for minimizing current drain in a battery powered data collector includes a stimulus device. In response to receipt of a first state of a control signal, the stimulus device provides a periodic stimulus signal. In response to receipt of a second state of the control signal the stimulus device ceases provision of the periodic stimulus signal. A switch device is coupled between the stimulus device and a load. When the switch device is in an on-state, and the periodic stimulus signal is provided from the stimulus device, the switch device provides the periodic stimulus signal to the load causing depletion of energy from the battery into the load. Responsive thereto the switch device provides the second state of the control signal to the control input of the stimulus device, that then ceases the provision of the periodic stimulus signal to the load thus ceasing the depletion of the energy from the battery.

The above-described apparatus is applied to a utility meter in the preferred embodiment. In this particular application a utility meter is monitored by a data logger which periodically broadcasts usage information to a central receiver. One very challenging aspect of designing this type of data logger is that it must stand alone - thus be energized from a battery rather than an AC line. As a result, the energy consumption must be kept extremely low to get significant usage from a battery charge. One significant cause of energy consumption in prior art data loggers is the energy consumption associated with input measurement circuitry. This circuitry is energized always and is used to measure the states of various switches associated with a usage measurement of the utility meter. Because this circuitry is continuously energized it represents a constant load on the data logger's battery source. This arrangement significantly reduces the battery's life.

In contrast, the present approach energizes the input measurement circuitry only for a very short time and does so infrequently. Because of this the energy consumption is kept to an engineered minimum. Certain aspects of the invention can be more readily appreciated by referring to the accompanying illustrations.

FIG. 1 is a schematic block diagram illustrating an apparatus for minimizing current drain in a battery powered data collector. An oscillator 103 outputs a periodic stimulus signal 102 having a first state and a second state. In the preferred embodiment, an oscillation frequency of 30 Hz was chosen to minimize the effect of switch bounce. The periodic stimulus signal 102 is fed into an RS flip-flop 105 via set input 106. An output 110, of the RS flip-flop 105, provides a first state of a switch power signal 112 in response to the periodic stimulus signal 102. The first state of the switch power signal 112 couples to the switch device 109 which is in an on-state or off-state. This switch device 109, is physically associated with an operative state of a utility meter and its change in state indicates a usage metric. Furthermore the operation of the switch 109 is independent of the surrounding circuitry which is used to measure its state. A state of the switch 109 is monitored by a latch device comprised of a D flip-flop 113. The on or off-state of the switch device 109 is transferred via the switch device output signal 114 to the D flip-flop 113. The D flip-flop 113 is used to latch the signal 114. The D flip-flop 113 is clocked by a reset-clock signal 123 derived from the first state of a switch power signal 112 by a delayed one shot 107. Those skilled in the art will recognize other structures having an equivalent latch function to the D flip-flip 113. Later a microcontroller 121 will be used to accumulate transitions of the switch 109—thus indicating usage of the particular utility medium.

FIG. 2 illustrates a waveform of the reset-clock signal 123. Signal 211 represents the switch power signal 112. Capacitive loading associated with the switch 109 circuitry requires a delay period before energizing the reset-clock signal 123. This capacitive loading is present because the switch 109 is typically mounted external to the circuit shown in FIG. 1 and is connected via wires. Thus, the sampling period 209 includes a delayed leading edge 203 and a subsequent falling edge 205 of a relatively low duty cycle. This delayed relationship is shown on FIG. 2. The first state of the switch power signal 112 on FIG. 1 will be used, in conjunction with the delayed one-shot 107, to reset the RS flip-flop 105 via a reset input 108. This first state is shown in FIG. 2 using reference number 213.

Periodically, as the periodic stimulus signal 102 is generated by the oscillator 103, the RS flip-flop 105 provides the first state 213 of the switch power signal 112 to the switch 109. If the switch 109 is in the on-state, meaning it is closed, it causes a conduction path between the battery 101 and the measurement load 111, and the battery's energy is depleted as shown by reference number 117. Typically, the measurement load 111 is comprised of a simple resistor network, and as described in the Background section is used to ensure an input impedance low enough to reject unwanted noise.

If the switch 109 is in the off-state, meaning it is open, no conduction path exists between the battery 101 and the measurement load 111, and the batter's energy is not depleted. In either case, a short time later, as determined by the preset delay of the delayed one-shot 107, the switch power signal 112 is terminated in response to the receipt of the falling edge of the reset-clock signal 123 from the delayed one-shot 107 to the reset input 108 of the RS flip-flop 105. When this happens, even if the switch 109 remains closed and even though there is a conduction path between the battery 101 and the measurement load 111, there is no depletion of the battery's energy because the switch power signal 112 remains off. Therefore, energy is depleted from the battery to the measurement load 111 only for a brief time when checking the state of the switch device 109.

Prior to a receipt of the falling state 205 of the reset-clock signal 123 from the delayed one-shot 107, a rising state 203 is supplied to the D flip-flop 113 to clock the current switch 109 state. As a result an output signal 115 of the D flip-flop 113 contains the information of the state of the switch device 109 after the latch device 113 received the rising edge 203 of the reset clock signal 123. The output signal 115 is fed into a change in state detector 119 and in parallel fashion into an input to the microcontroller 121. As mentioned above the microcontroller, in tandem with the latch device 113 and the change in state detector 119 form a measurement means (101) for accumulating the transitions between the on-state and the off-state of the switch power signal 112 and provides an accumulated result indicative of the utility meter's usage. Additionally, the microcontroller 121 is normally in a sleep mode and draws minimal current from the battery 101 and wakes up only if a change of state signal 127 is received from the change in state detector 119. When the microcontroller wakes-up energy is drawn from the battery 101 as shown by reference number 125. Once the change of state is processed as described above, the microcontroller 121 goes to sleep again, thus drawing the minimum current from the battery 101. In this manner, a significant benefit of battery power preservation is achieved. Periodically, the microcontroller 121 transmits the utility medium usage information, derived from accumulation of the switch 109 transitions, to a centralized data collector. Preferably this accomplished via an RF (radio frequency) link.

Figure 4:
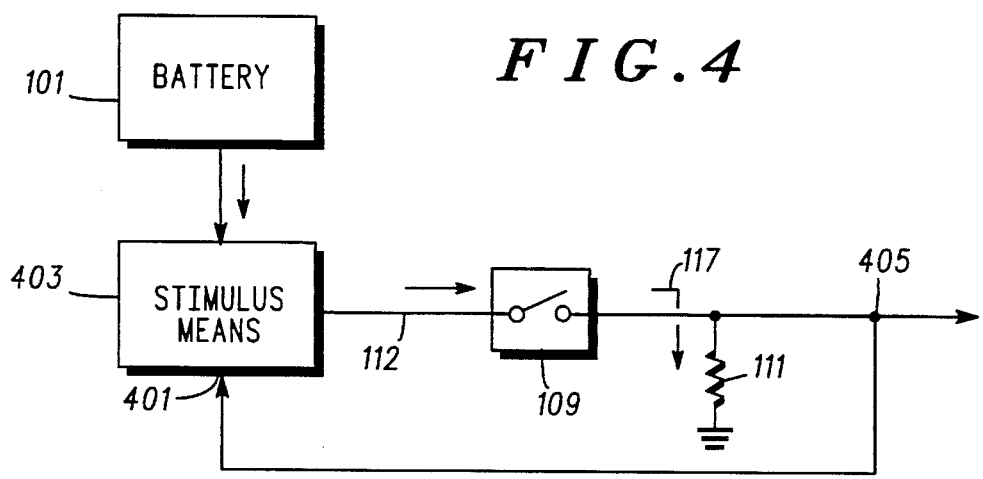
FIG. 4 is a schematic block diagram illustrating an apparatus for minimizing current drain in a battery powered data collector, in accordance with an alternative embodiment of the invention.

FIG. 3 and FIG. 4 show schematic block diagrams illustrating alternative embodiments for minimizing current drain in a battery powered data collector. Whereas in FIG. 1 an indirect means of shutting off the battery drain is shown, in FIG. 3 and FIG. 4 a direct action of the switch causes the battery drain reduced.

For instance, in FIG. 3 two switch devices 109 and 109' are connected to the output 110 of the RS flip-flop 105 and they receive the periodic stimulus signal 112. Given this teaching it would be obvious to those skilled in the art that more than two switch devices may be connected in parallel. If either of the switch devices 109, 109' are in the on-state, the switch devices output signals 114, 114' go to the measurement load 111, 111' and through the logical OR gate 301 which resets the RS flip-flop 105 using the reset input 108. The measurement load 111, 111' receives power from the battery 101 only if the corresponding switch device 109, 109' is in the on-state, or closed position, and consequently the energy of the battery 101 is conserved. The signals 114 and 114' can be fed into a latch device as described above.

In FIG. 4 a stimulus device 403 generates the periodic stimulus signal 112 which is received by the switch device 109. When the switch device 109 is in the on-state, the switch 109 provides a second state of a control signal, here 405, to a control input 401 of the stimulus device 403. This second state of the control signal 405 then causes the ceasing of the provision of the periodic stimulus signal 112 to the load 111 thus ceasing the depletion of the energy from the battery 101. Thus, the battery is connected to the load 111 only when the switch device 109 is in the on-state and the periodic stimulus signal 112 is provided. Also, provision of the periodic stimulus signal 112 to the switch 109 causes the stimulus device 403 to directly disconnect the periodic stimulus signal 112 from the switch 109, thus disconnecting the battery 101 from the load—ceasing the drain of energy from the battery 101.

In conclusion, an improved apparatus for minimizing input measurement circuit and control circuit current drain in a battery powered data collector has been described. In particular, a signal for stimulating an input measurement circuit is turned off shortly after the battery starts supplying current to an input circuit. Also, a microcontroller only depletes energy for the battery for a short time and only when an input condition changes. This approach offers a significant advantage over prior art schemes because battery drain is kept to a minimum. This make it practical to construct a battery operated data logger that has a long field life.

What is claimed is:

1. An apparatus for minimizing current drain in a battery powered data collector, the apparatus comprising:

stimulus means having a control input, wherein responsive to a first state of a control signal at the control input, the stimulus means provides a periodic stimulus signal, and responsive to a second state of the control signal at the control input the stimulus means ceases the provision of the periodic stimulus signal;

a load; and switch means coupled between the stimulus means and the load, the switch means having an on-state and an off-state, wherein responsive to the on-state and the provision of the periodic stimulus signal from the stimulus means, the switch means provides the periodic stimulus signal to the load causing depletion of energy from the battery into the load, and in response to the periodic stimulus signal the switch means provides the second state of the control signal to the control input of the stimulus means, that then ceases the provision of the periodic stimulus signal to the load thus ceasing the depletion of the energy from the battery.

2. An apparatus in accordance with claim 1 wherein the second state of the control signal is provided from the switch means to the control input of the stimulus means a predetermined time after the switch means provides the periodic stimulus signal to the load.

3. An apparatus in accordance with claim 2 further comprising latch means for latching the second state of the control signal when the periodic stimulus signal is supplied to the load.

4. An apparatus for minimizing current drain in a battery powered data collector, the apparatus comprising:

an oscillator for outputting a periodic stimulus signal having a first state and a second state;

a flip-flop having a set input for receiving the periodic stimulus signal and a reset input, wherein the flip-flop has an output for providing a first state of a switch-power signal responsive to receipt of the first state of the periodic stimulus signal at the set input, and wherein the output of the flip-flop provides a second state of the switch-power signal, responsive to receipt of a control signal at the reset input;

a load; and a switch device coupled between the output of the flip-flop and the load, the switch device having an on-state and an off-state, wherein responsive to the on-state and the provision of the first state of the switch-power signal from the output of the flip-flop the switch device provides the first state of the switch-power signal to the load causing depletion of energy from the battery into the load, and in response to the switch-power signal the switch device provides the control signal, derived from the first state of the switch-power signal, to the reset input of the flip-flop causing the provision of the second state of the switch-power signal to the load thus ceasing the depletion of the energy from the battery into the load.

5. An apparatus in accordance with claim 4 wherein the control signal is provided from the switch means to the reset input of the flip-flop a predetermined time after the switch means provides the switch-power signal to the load.

6. An apparatus in accordance with claim 5 further comprising a latch device for latching a voltage measured across the load after the switch-power signal is supplied to the switch means and before the control signal is provided to the reset input of the flip-flop, wherein the latch device has an output for providing a latched state indicative of the latched voltage.

7. An apparatus in accordance with claim 6 further comprising a change in state detector coupled to the latch device, wherein responsive to a change in state of the latched state the change in state detector provides a wake-up signal for energizing another load device, wherein the another load device depletes energy from the battery.

8. An apparatus for minimizing current drain in a battery powered data collector, the apparatus comprising:

an oscillator for outputting a periodic stimulus signal having a first state and a second state;

a flip-flop having a set input for receiving the periodic stimulus signal and a reset input, wherein the flip-flop has an output for providing a first state of a switch-power signal responsive to receipt of the first state of the periodic stimulus signal at the set input, and wherein the output of the flip-flop provides a second state of the switch-power signal, responsive to receipt of a control signal at the reset input;

a load;

a switch device coupled between the output of the flip-flop and the load, the switch device having an on-state and an off-state, wherein responsive to the on-state and the provision of the first state of the switch-power signal from the output of the flip-flop the switch device provides the first state of the switch-power signal to the load causing depletion of energy from the battery into the load; and a delayed one-shot for receiving the first state of the switch-power signal and responsive thereto for providing a reset-clock signal, wherein the output of the flip-flop provides the second state of the switch-power signal responsive to transition of the reset-clock signal into the reset input of the flip-flop dependent on a time-out of the delayed one-shot, wherein responsive to the second state of the switch-power signal provided by the switch device the load ceases the depletion of energy from the battery into the load.

9. An apparatus in accordance with claim 8 further comprising a latch device for latching a voltage measured across the load after the switch-power signal is supplied to the switch means and before the control signal is provided to the reset input of the flip-flop, wherein the latch device has an output for providing a latched state indicative of the latched voltage.

10. An apparatus in accordance with claim 9 further comprising a change in state detector coupled to the latch device, wherein responsive to a change in state of the latched state the change in state detector provides a wake-up signal for energizing another load device, wherein the another load device depletes energy from the battery.

11. A utility meter data logger comprising:

stimulus means having a control input, wherein responsive to a first state of a control signal at the control input, the stimulus means provides a periodic stimulus signal, and responsive to a second state of the control signal at the control input the stimulus means ceases the provision of the periodic stimulus signal;

a switch input circuit including a load coupled to the stimulus means, the switch input circuit for receiving a switch signal having an on-state and an off-state, wherein transitions between the on-state and the off-state of the switch signal is indicative of usage of the utility meter, wherein responsive to the on-state and the provision of the periodic stimulus signal from the stimulus means, the switch input circuit provides the periodic stimulus signal to the load causing depletion of energy from the battery into the load, and in response to the provision of the periodic stimulus signal, the switch input circuit provides the second state of the control signal to the control input of the stimulus means, that then ceases the provision of the periodic stimulus signal to the load thus ceasing the depletion of the energy from the battery; and measurement means for accumulating the transitions between the on-state and the off-state of the switch signal and for providing an accumulated result indicative of the utility meter's usage.

12. An apparatus in accordance with claim 11 wherein the second state of the control signal is provided from the switch means to the control input of the stimulus means a predetermined time after the switch means provides the periodic stimulus signal to the load.

13. An apparatus in accordance with claim 12 further comprising latch means for latching the second state of the control signal when the periodic stimulus signal is supplied to the load, and wherein the measurement means accumulates transitions supplied by the latch means responsive to transitions of the periodic stimulus signal.

* * * * *